Feb. 15, 1955  W. FALCK  2,702,362
THREE-PHASE ALTERNATING CURRENT MACHINE FOR SELECTIVE
CONNECTION TO DIFFERENT LINE VOLTAGES
Filed Nov. 2, 1953  2 Sheets-Sheet 1

INVENTOR
WERNER FALCK
BY
ATTORNEY

United States Patent Office 2,702,362
Patented Feb. 15, 1955

2,702,362

THREE-PHASE ALTERNATING CURRENT MACHINE FOR SELECTIVE CONNECTION TO DIFFERENT LINE VOLTAGES

Werner Falck, Nurnberg, Germany, assignor to Siemens-Schuckertwerke Aktiengesellschaft, Berlin-Siemensstadt, Germany, a corporation of Germany Application November 2, 1953, Serial No. 389,831

Claims priority, application Germany November 27, 1952

4 Claims. (Cl. 318—225)

My invention relates to three-phase alternating-current machines of the multiple-voltage type that can be selectively operated by different voltages.

It is often desired that one and the same motor of this type be suitable for connection to more than two supply lines of respectively different voltages and that always the same terminals be used for connecting the machine with the particular line from which it is to be energized. When transferring from one to another voltage, it is necessary to change not only the line connections of the motor but also the "internal" connections between the windings of the machine. If the change in internal connections is effected in the terminal box for the line terminals of the machine, then this box must accommodate a large number of individual terminals. For instance, as many as twelve terminals are then needed if the machine is to be operable with three different voltages. This requires very large dimensions of the terminal box and makes it difficult to properly change the connections within the box since the necessary connecting or jumper leads must cross each other.

It is an object of my invention to eliminate these shortcomings.

To this end, and according to a feature of my invention, I provide a machine of the above-mentioned type with two separate terminal boxes, namely with a line-terminal box that contains the terminals to which the supply line is to be attached, and a connection box equipped only with the terminals for providing the internal circuit connections required for the selected operating voltage. The separate connection box is preferably mounted on the machine structure on the side opposite that of the line terminal box.

Figure 1:
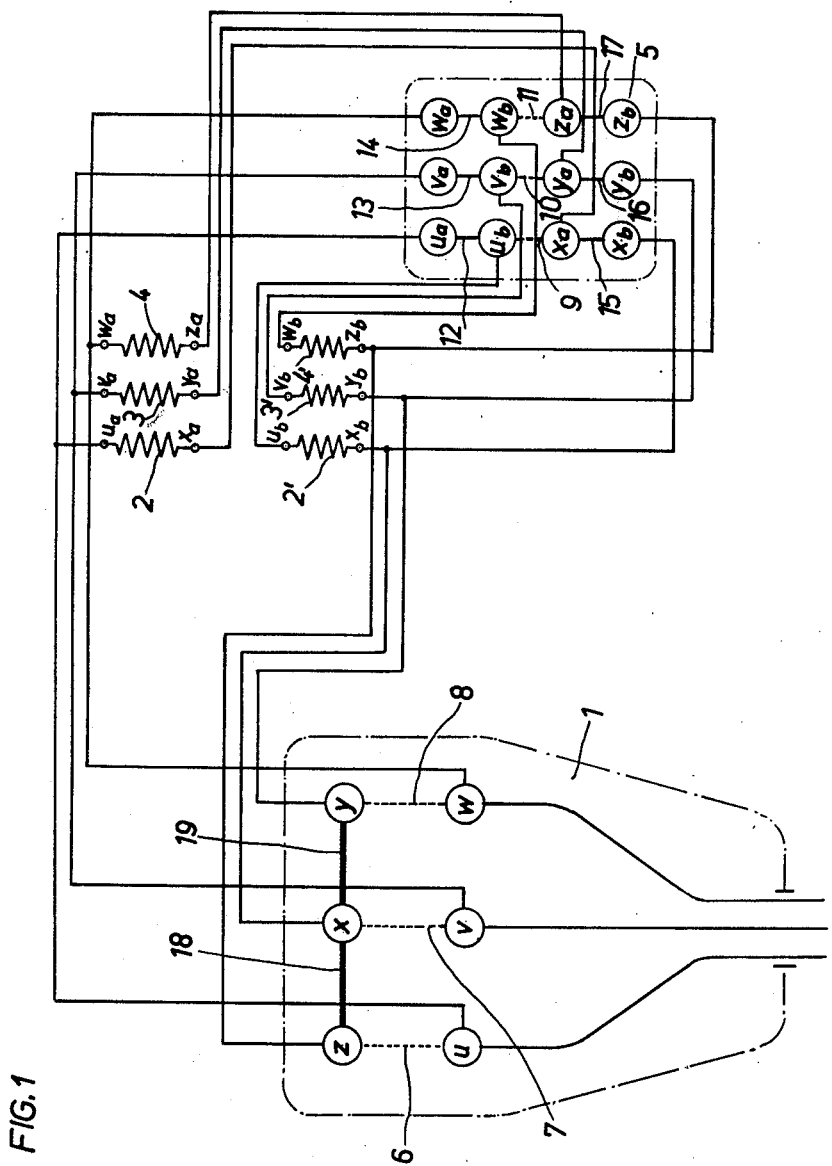
Figure 2:
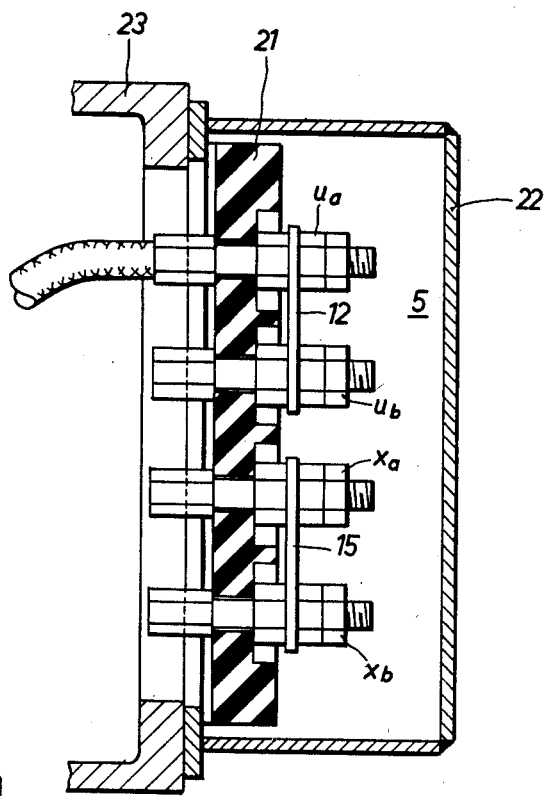
Figure 3:
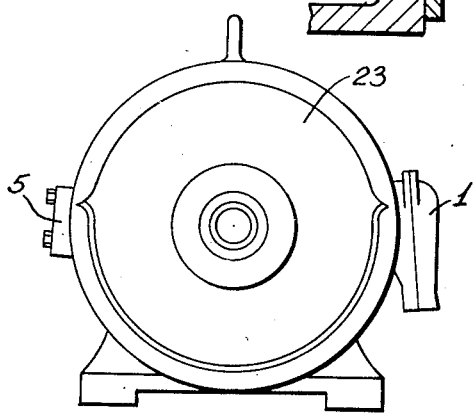

The foregoing and more specific objects and features of the invention will be apparent from the following description in conjunction with the embodiments exemplified by the drawings in which:

Fig. 1 shows a circuit diagram of an electric motor with two sets of three-phase windings for operation with at least three different line voltages, Fig. 2 is a cross-sectional view of the connecting box that forms part of the same machine; and Fig. 3 is a schematic view of the exterior of the machine with the line-terminal box and the connecting box.

The illustrated motor has its stator windings subdivided into two three-phase sets 2, 3, 4 and 2′, 3′, 4′. The six individual windings are insulated from each other, and each has two end points, such as the points $u_a$ and $x_a$ of winding 2. The machine housing 23 (Fig. 3) in which the stator windings are located carries a line-terminal box 1 and a connection box 5. Mounted within the line terminal box 1 are three line terminals $u$, $v$, and $w$ (Fig. 1) and three connection terminals $x$, $y$, and $z$. The end points $u_a$, $v_a$ and $w_a$ are directly connected with respective line terminals $u$, $v$ and $w$. The end points $x_b$, $y_b$ and $z_b$ of windings 2′, 3′ and 4′ are directly connected with respective connection terminals $x$, $y$ and $z$. The other end points $x_a$, $y_a$, $z_a$ and $u_b$, $v_b$ and $w_b$ are connected by individual leads to the correspondingly designated six terminals of the connection box 5. The connection box 5 has six additional terminals that are individually connected with the remaining winding end points $x_b$, $y_b$, $z_b$ and $u_a$, $v_a$, $w_a$ and are designated by the same reference characters as these respective end points.

Each of the terminal boxes 1 and 5 is equipped with jumper means, such as jumper leads or bars, for interconnecting the box terminals. Three such jumpers are shown by dotted lines at 6, 7, 8 and two jumpers 18 and 19 are shown in full lines in Fig. 1 as pertaining to the line-terminal box 1. The same illustration shows for connection box 5 three jumpers 9, 10, 11 in dotted lines and six jumpers 12 to 17 in full lines. The jumpers in both boxes are selectively applied as follows:

Assume that only the jumpers shown in dotted lines are used, that is, the jumpers 6, 7, 8 in box 1 and the jumpers 9, 10, 11 in box 5, all others being omitted. In that case, the jumpers 6, 7, 8 bridge the terminals $u$ and $z$, $v$ and $x$, $w$ and $y$, while the jumpers 9, 10 and 11 in box 5 interconnect the terminals $x_a$ and $u_b$, $y_a$ and $v_b$, $z_a$ and $w_b$. The three-phase stator winding is now delta connected for operation with one of its rated voltages.

Assume now that in box 5, jumpers 9, 10 and 11 are removed and are replaced by jumpers 12 to 17 so as to interconnect the terminals $u_a$ and $u_b$, $v_a$ and $v_b$, $w_a$ and $w_b$, $x_a$ and $x_b$, $y_a$ and $y_b$, $z_a$ and $z_b$. With this connection, the two sets of stator windings, previously series connected with each other, are now connected in parallel relation. The stator winding as a whole is now set for double delta connection so that the motor can be energized by a rated line voltage one-half as large as the above-mentioned voltage for single delta connection.

If it is desired to connect the stator winding in double star, then the jumpers 12 to 17 are given the same arrangement as with the above-described double delta connection, that is, the two sets of stator windings remain parallel connected with each other. However, in line terminal box 1, the jumpers 6, 7 and 8 are to be removed and the jumpers 18 and 19 are to be substituted for short-circuiting the terminals $z$, $x$, $y$ to form a star point. Now the motor can be connected to a voltage related to that of the double delta connection in accordance with the ratio 1:3.

Of course, with a corresponding number of connecting terminals, a still larger number of connecting variations is afforded.

As apparent from Fig. 2, the connecting box 5 may consist of a simple sheet-metal housing 22 which encloses an insulating base 21 carrying the terminals. The connecting box is preferably mounted on the side of the motor opposite to that carrying the line-terminal box 1 (Fig. 3).

In machines according to the invention, the changes in connection can all be made in a simple manner since no crossings of the jumpers are needed. For that reason, the connecting box can be given a relatively small size. The size of the line-terminal box may be in accordance with the conventional dimensions.

I claim:

1. A three-phase alternating-current machine for selective connection to different line voltages, comprising a plurality of sets of three-phase machine windings, each set having three individual windings and each winding having two end points; a line-terminal box having as many terminals as the machine has windings and including three terminals for connection to a power supply line, each of said terminals being connected to one end point of one of said respective windings, and jumper means selectively interconnecting said terminals in said line-terminal box; a connection box having at least twice as many terminals as said line-terminal box, said latter terminals being individually connected with said terminals of said line-terminal box and with said other end points respectively, and jumper means in said connection box selectively interconnecting said winding sets in parallel relation and series relation respectively.

2. A three-phase machine for selective operation with different line voltages, comprising a plurality of sets of machine windings each having two end points; a line-terminal box having as many groups of line terminals as the machine has sets of windings, the terminals of each of said groups being individually connected with one end point of each winding of one of said sets, and jumper means in said first box selectively connectable, on the one hand, between the terminal of one group and, on the other hand, between individual terminals of one group and the individual terminals of another group; a connection box having twice as many groups of terminals as said line-terminal box, a first plurality of said latter groups having three respective terminals of each group connected with those of an individual group of said line terminals, a second plurality of said connection-box groups having the respective terminals of each group connected with the other end points of an individual set of windings, and jumper means in said connection box selectively connectable, on the one hand, between the terminals of each of said first plurality of groups and the terminals of one of the respective groups of said second plurality and, on the other hand, between the respective terminals of the groups forming said second plurality.

3. A three-phase alternating-current machine for selective connection to different line voltages, comprising two three-phase sets of machine windings, each set having three individual windings and each winding having two end points; a line-terminal box having six terminals connected with one of the end points of each of said respective six windings, and selective connecting means in said line-terminal box for interconnecting said terminals in star and delta relation respectively; a connection box having terminals individually connected with the respective other end points and with the respective terminals of said line-terminal box, and selective connecting means disposed in said connection box and adapted for selective parallel and series connection of each two of the windings of said respective two sets.

4. In a three-phase machine according to claim 3, said line-terminal box being mounted on one side of the machine, and said connection box being mounted on the opposite side of the machine.

No references cited.